United States Patent [19]

Crane, III et al.

[11] Patent Number: 4,977,971
[45] Date of Patent: Dec. 18, 1990

[54] HYBRID ROBOTIC VEHICLE

[75] Inventors: Carl D. Crane, III, Gainesville, Fla.; Dana S. Haukoos, Fountain Valley, Calif.

[73] Assignee: University of Florida, Gainesville, Fla.

[21] Appl. No.: 353,027

[22] Filed: May 17, 1989

[51] Int. Cl.⁵ ..................... B62D 63/02; B62D 55/075
[52] U.S. Cl. ........................ 180/8.3; 180/9.3; 180/9.32; 280/840; 33/356; 901/1; 901/46
[58] Field of Search .................. 180/8.1, 8.2, 8.3, 8.4, 180/8.5, 8.6, 9.28, 9.3, 9.32, 9.33, 9.34, 9.35, 9.36; 280/840; 901/1, 46, 50, 27, 28, 29; 33/356, 327

[56] References Cited

U.S. PATENT DOCUMENTS

| | | | |
|---|---|---|---|
| 4,539,760 | 9/1985 | Marchent et al. | 33/356 |
| 4,611,296 | 9/1986 | Niedermayr | 901/46 |
| 4,647,053 | 3/1987 | Kanno | 280/840 |
| 4,855,822 | 8/1989 | Narendra | 901/1 |

FOREIGN PATENT DOCUMENTS

| | | | |
|---|---|---|---|
| 2591987 | 6/1987 | France | 180/8.7 |
| 0138071 | 10/1981 | Japan | 180/8.2 |
| 0191673 | 11/1983 | Japan | 180/8.2 |
| 0229680 | 10/1986 | Japan | 180/8.3 |
| 2236695 | 10/1987 | Japan | 901/1 |
| 0203484 | 8/1988 | Japan | 180/8.2 |

Primary Examiner—Charles A. Marmor
Assistant Examiner—Mitchell Bompey
Attorney, Agent, or Firm—Kerkam, Stowell, Kondracki & Clarke

[57] ABSTRACT

A hybrid robotic vehicle is provided for use in environments which are hazardous to humans, the vehicle being adapted to carry a payload for use in viewing the area or acquiring other types of sensory data. The hybrid robotic vehicle has a main body and four appendages or legs, each of which has a wheel assembly and a track assembly, and is configured to operate having three degrees-of-freedom about one vertical and two horizontal axes, the three degrees-of-freedom permitting improved capability to cross obstacle-strewn terrain, as well as to traverse inclined surfaces while maintaining the main body and its payload in an upright and level attitude. The vehicle may operate in any of wheeled, tracked, or legged modes, with actuators controlling each of the three joint angles on each leg, and having separate motors for driving the wheels and the tracks, the control being effected by a human operator through a control panel computer interface, and a computer relaying commands through a cable tether connected to the vehicle.

25 Claims, 9 Drawing Sheets

HYBRID ROBOTIC VEHICLE

BACKGROUND OF THE INVENTION

1. Field of the invention

The present invention relates to mobile robotic vehicles, particularly to robotic vehicles capable of operating in areas which are hazardous to humans.

2. Description of Related Art

The term robotic vehicle refers to a vehicle which has what may be called "robotic" features. In this context, "robotic" generally implies a mechanism which employs some level of computer control and sensory feedback. Another common term for robotic vehicle is mobile robot, and these will be used interchangeably in this application. One primary motivation for the use of robotic vehicles is to replace humans in areas which may be extremely hazardous. Examples include underwater, outer space, battlefield, and high-radiation nuclear environments. As the technologies related to design of robotic vehicles mature, their range of practical application will continue to grow.

A particular challenge in the art is to design a robotic vehicle which is able to maneuver in an obstacle-strewn environment. Depending upon the specific environment in which the vehicle is to be used, the vehicle should generally be able to climb stairs, traverse uneven surfaces, and cross obstacles in order to perform tasks, such as inspection and/or monitoring, throughout its working environment. The vehicle may serve as a platform for future man-machine interface, telepresence, and autonomous navigation experiments. Such vehicles will generally be operated remotely, for example, by tethering the vehicle to a power source and an external computer Robotic vehicles are often categorized according to the type of locomotion they employ. Typically, mobile robots use wheels, tracks, legs, and in some instances, a combination of these. Wheeled systems are the simplest and most energy efficient of these types of locomotion systems. They can provide maximum maneuverability for hallways and restricted areas of buildings. They cannot, however, easily negotiate stairs or obstacles of significant height. Tracked or legged systems can be used to overcome the shortcomings of wheeled systems for surfaces which are soft or uneven. While tracked systems are preferable to legged systems from the viewpoint of simplicity of design and control, the crossing of some obstacles requires a legged locomotion system. For example, if a robotic vehicle were required to be able to climb obstacles of a given predetermined height and length or depth which may be on the order of 24 inches for an indoor environment, neither wheels nor tracks would suffice where the overall desired size of the vehicle must be relatively compact.

Hybrid systems aim to combine the advantages and minimize the disadvantages of two or more of the previously mentioned types of locomotion. One recent example of a hybrid robotic vehicle known in the art is the vehicle disclosed in U.S. Pat. No. 4,702,331, issued to Hagihara et al, and assigned on its face to Mitsubishi Denki Kabushiki Kaisha. That vehicle is provided with wheeled, tracked and legged modes of operation. While such a vehicle may therefore employ any of the three types of locomotion previously described, the vehicle does not have the capability of maintaining the body or platform of the vehicle in an upright and level position as it maneuvers across non-horizontal surfaces or through an uneven environment. Further, the construction of the vehicle restricts the legs to operating with only two degrees of freedom, which impairs the ability of the vehicle to traverse or cross over certain objects, particularly larger objects.

The principal considerations in designing a vehicle will depend to some extent on the environment in which it is to be used. For the particular example of a monitoring-type vehicle for use in the interior of a building, the vehicle must be narrow enough to fit through a standard doorway (approximately 30 inches). In addition, the overall system weight is important in that the weight must be maintained at a reasonable level such that power demands for the driving of the vehicle and joint actuation can be met with proven technology.

It is therefore an important object of the present invention to provide a hybrid robotic vehicle having enhanced ability to overcome or traverse articles or terrain, and operate in an obstacle-strewn environment.

It is another important object of the present invention to provide a hybrid robotic vehicle which has the ability to maintain a payload in a horizontal or other fixed attitude as the vehicle traverses uneven surfaces.

It is a further important object of the present invention to provide a robotic vehicle which is capable of operating in wheeled, tracked, or legged modes wherein a plurality of appendages having three degrees of freedom are attached to a main body containing or comprising the payload.

SUMMARY OF THE INVENTION

These and other objects of the present invention are accomplished by providing a robotic vehicle capable of operating in one of three modes, i.e. wheeled, tracked or legged, the chosen mode primarily depending upon the particular locomotion task at hand. The vehicle is provided with four appendages or legs which are capable of being configured or oriented to selectively operate in each of the three modes, and each leg has three degrees-of-freedom or is able to pivot about one vertical and two distinct horizontal axes.

In one particular embodiment of the invention the hybrid robotic vehicle comprises a main body; a plurality of legs, each of the plurality of legs being operatively connected to the main body and being pivotable about a vertical axis with respect to the main body; means for selectively operating the vehicle in a wheeled mode, in a tracked mode, or in a legged mode, wherein each of the plurality of legs further comprises a wheel assembly and a track assembly, and wherein the wheel assembly on each of the plurality of legs has drive means for rotating the wheel about a first horizontal axis; and the track assembly on each of the plurality of legs has drive means for driving the track, the track assembly further being pivotable about a second horizontal axis spaced apart at a predetermined distance from the first horizontal axis.

In another particular embodiment of the invention the hybrid robotic vehicle comprises a main body, a plurality of appendages, each of the plurality of appendages being connected to the main body, each of the plurality of appendages being pivotable about a vertical axis with respect to the main body;

wherein each of the plurality of appendages further comprises a strut assembly having a proximal end and a distal end with respect to the vertical axis, each of the strut assemblies being pivotable about a first horizontal axis at the proximal end;

each of the appendages further having a wheel assembly and a track assembly, the wheel assembly being disposed at the proximal end of the strut assembly, the wheel assembly being rotatable independently of the strut assembly about a second horizontal axis, the track assembly being connected to the strut assembly near the distal end of the strut assembly, the track assembly being pivotable about a horizontal axis with respect to the strut assembly;

means for selectively positioning the plurality of appendages into a plurality of predetermined locomotion configurations; and locomotion means for moving the vehicle across a surface, the locomotion means being operatively connected to the wheel assembly and the track assembly.

BRIEF DESCRIPTION OF THE DRAWINGS

These and other features of present invention and the attendant advantages will be readily apparent to those having ordinary skill in the art and the invention will be more easily understood from the following detailed description of the preferred embodiments of the present invention taken in conjunction with the accompanying drawings wherein like reference characters represent like parts throughout the several views, and wherein.

DETAILED DESCRIPTION OF THE PREFERRED EMBODIMENTS

Figure 1:
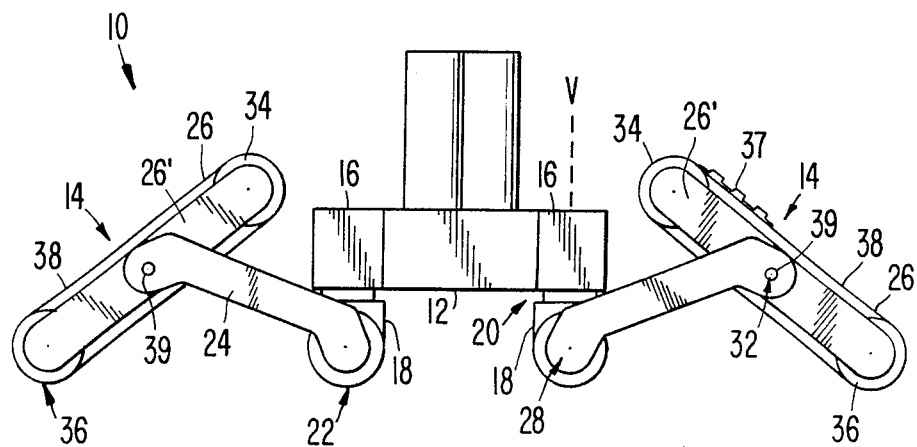
FIG. 1 is a side elevation view of the hybrid robotic vehicle in a preferred embodiment of the present invention.

Referring now to the drawings, wherein like reference numerals refer to like elements throughout, FIG. 1 depicts a hybrid robotic vehicle indicated generally at numeral 10. The vehicle 10 has a main body 12, which may be referred to interchangeably as a platform or payload support means. Main body 12 has four appendages or legs 14 attached thereto at or near each of the four corners of the main body. Looking momentarily to FIG. 2, the vehicle 10 may also be described as having a longitudinal axis extending from left-to-right in that figure and a transverse axis, extending from the top of the sheet to the bottom of the sheet. It is to be recognized that, in the depicted preferred embodiment, each of legs 14 has identical components, and each differs in construction from the others primarily only in terms of left-to-right or front-to-rear symmetries. Therefore, while the following discussion will refer to the construction of only one of the four depicted legs, it should be readily apparent that all of the legs 14 will be of similar construction.

A first actuator housing 16 is disposed at a corner of the main body 12, and is adapted to house a first joint actuator, the preferred design of which will be discussed in detail later in the specification. A second actuator housing 18 is connected to and extends downwardly from the first actuator housing, the first actuator operating to selectively pivot the second actuator housing, and thus leg 14, about a vertical axis V with respect to the main body 12. The pivotable connection imparts a first degree-of-freedom to the appendage or leg 14, the connection being alternatively referred to as a first joint 20.

Figure 2:
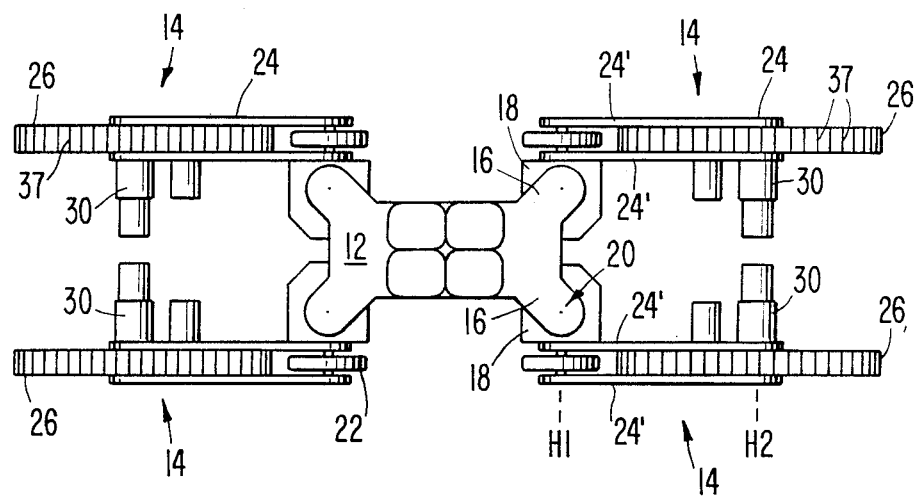
FIG. 2 is a top plan view of the hybrid robotic vehicle.

As best seen when viewing FIGS. 1 and 2 together, the leg is equipped with a wheel assembly 22, a strut assembly 24, and a track or endless belt assembly 26. The strut assembly 24, which comprises a pair of spaced, parallel arms 24' extending from a proximal end nearest the main body to a distal end, is operatively and pivotably connected at its proximal end to an associated second joint actuator which is disposed in the second actuator housing 18 at the corner of the main body. The second actuator operates to selectively pivot strut assembly 24 (upon command) about a horizontal axis H1, giving the leg a second degree-of-freedom at this second joint 28.

At the proximal end of the strut assembly 24, the parallel arms 24' straddle the wheel 22 which is preferably connected in a manner allowing it to rotate about horizontal axis H1. At the distal end of strut assembly 24, the parallel arms 24' straddle the track assembly 26, and a central portion of the track assembly is pivotably attached to the strut 24. A third actuator housing 30 is disposed at an inboard side of the strut assembly at this distal end, and houses a third joint actuator This third joint actuator is operatively connected to the track assembly 26, and is operable to selectively pivot the track assembly about a second horizontal axis H2 with respect to strut assembly 24. This strut-to-track pivotable connection gives leg 14 a third degree-of-freedom and will alternatively be referred to as third joint 32.

The track assembly 26 may preferably comprise a pair of parallel arms 26' (only one of each pair shown in FIG. 1) which have rollers or track wheels 34, 36 rotatably attached therebetween near each end of the arms 26'. An endless belt 38 is also provided, which extends around the pair of rollers. Endless belt 38 may preferably be of a type having transversely disposed treads 37 in a manner well known in the art, FIG. 1 showing only a portion of the belt 38 in detail showing these treads. The pivotable connection of the track assembly 26 to the strut assembly 24 is preferably accomplished by providing an axle 39 extending through strut arms 24' which is fixedly attached to track arms 26' at substantially a central point of the track arms 26'.

Figure 3A:
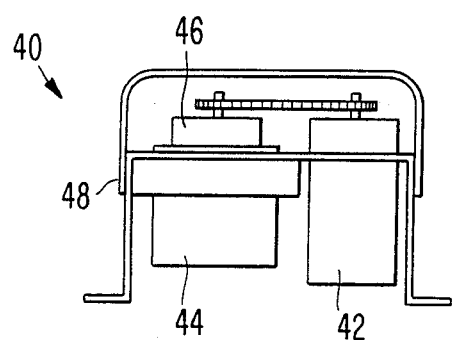
FIGS. 3 a,b are schematic views of two configurations of a power pack adapted to be employed as a joint actuator in the present invention.

Turning now to FIGS. 3 and 4, the design and positioning of the joint actuators of the present invention will be discussed in further detail. FIGS. 3 a,b depict two alternative embodiments of a power pack 40 adapted to be used as joint actuators. The power pack of FIGS. 3a,b preferably comprises a Sensorimotor TM electric motor 42, developed by Seiberco, Inc., operatively coupled with a harmonic drive 44, which is employed to convert the output of the electric motor to a desired speed and power for use with the robotic vehicle. The harmonic drive operates as a speed reducer with a ratio in the range of 60:1 to 200:1. A harmonic drive was selected for its compactness, light weight and efficiency. A fail-safe brake 46 is also provided in the coupling between the motor 42 and harmonic drive 44.

Figure 3B:
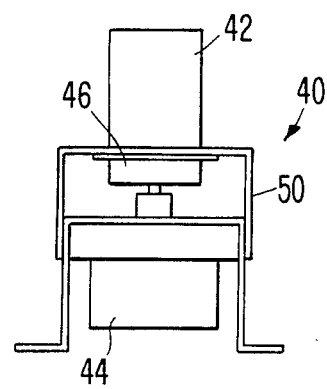

The power pack of FIG. 3a represents what will be termed a "parallel" configuration wherein the motor and drive are mounted side-by-side within a housing 48 with an appropriate linkage extending between the two components. FIG. 3b depicts a "series" configuration wherein harmonic drive 44 is mounted in housing 50 and is coupled "in-line" with motor 42 mounted to the exterior of housing 50. The use of a power pack 40 facilitates replacement of the unit and also promotes interchangeability of the unit such that the same assembly may be used for all of the joint actuators required for operation of the vehicle 10. The choice between the "parallel" and "series" configurations may primarily depend upon the particular space restrictions at a particular joint or on a particular configuration of the vehicle.

Other actuator means may alternatively be employed, although the system described above is currently believed to provide optimal performance. For this particular robotic vehicle application, hydraulic, pneumatic, and other electric actuator systems are sufficiently well developed technologies that it may be possible to design a system which would be suitable for use. Hydraulic motors have the advantage of a high power-to-weight ratio, but also have the potentially overwhelming disadvantages that the required compressor and reservoir tanks would be too heavy to mount on board, and that the system is susceptible of hydraulic oil leakage. Pneumatic systems share the same disadvantage of requiring a compressor and reservoir, and precise control in the system is more difficult to achieve as the working fluid is compressible.

Within the electric actuator technology, either servo or stepper motors known in the art could also be employed. The Sensorimotor of the preferred embodiment incorporates desirable features of both of these types and eliminates at least one disadvantage, lower power-to-weight ratio, associated with stepper motors. The design of the Sensorimotor also incorporates inherent positional feedback information identical to that of a D.C. brushless motor, and therefore no external position-sensing device is required.

Figure 4A:
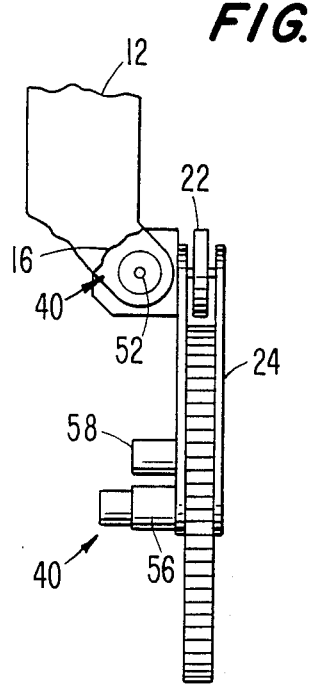
FIGS. 4 a,b are partial cutaway views of the first and second actuator housings, showing the positioning of the joint actuators within these housings.
Figure 4B:
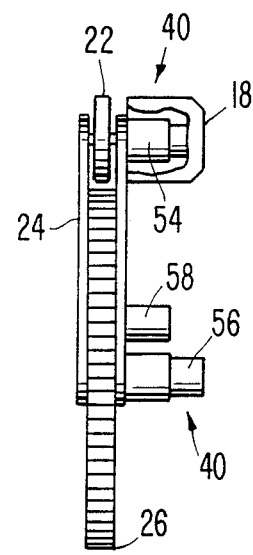

FIGS. 4 a,b depict partial cutaway views of the first actuator housing on the main body 12 of the vehicle (FIG. 4a) and of the second actuator housing (FIG. 4b), showing schematically the positioning of a power pack 40 adapted to operate as a first joint actuator 52 and a second joint actuator 54 respectively. A third power pack 40 is shown positioned at third actuator housing 30, and this power pack is thus adapted to operate as third joint actuator 56. FIG. 2 and FIGS. 4a, b also depict, in schematic form, a motor 58 which is used to drive the wheel and track assembly. With appropriate drive linkages known in the art, a single motor such as that depicted schematically could be used to drive both the wheel and the track assembly. The drive means may, however, preferably comprise two motors mounted at appropriate locations on each leg 14 which will separately drive the wheel and track assembly.

Figure 5:
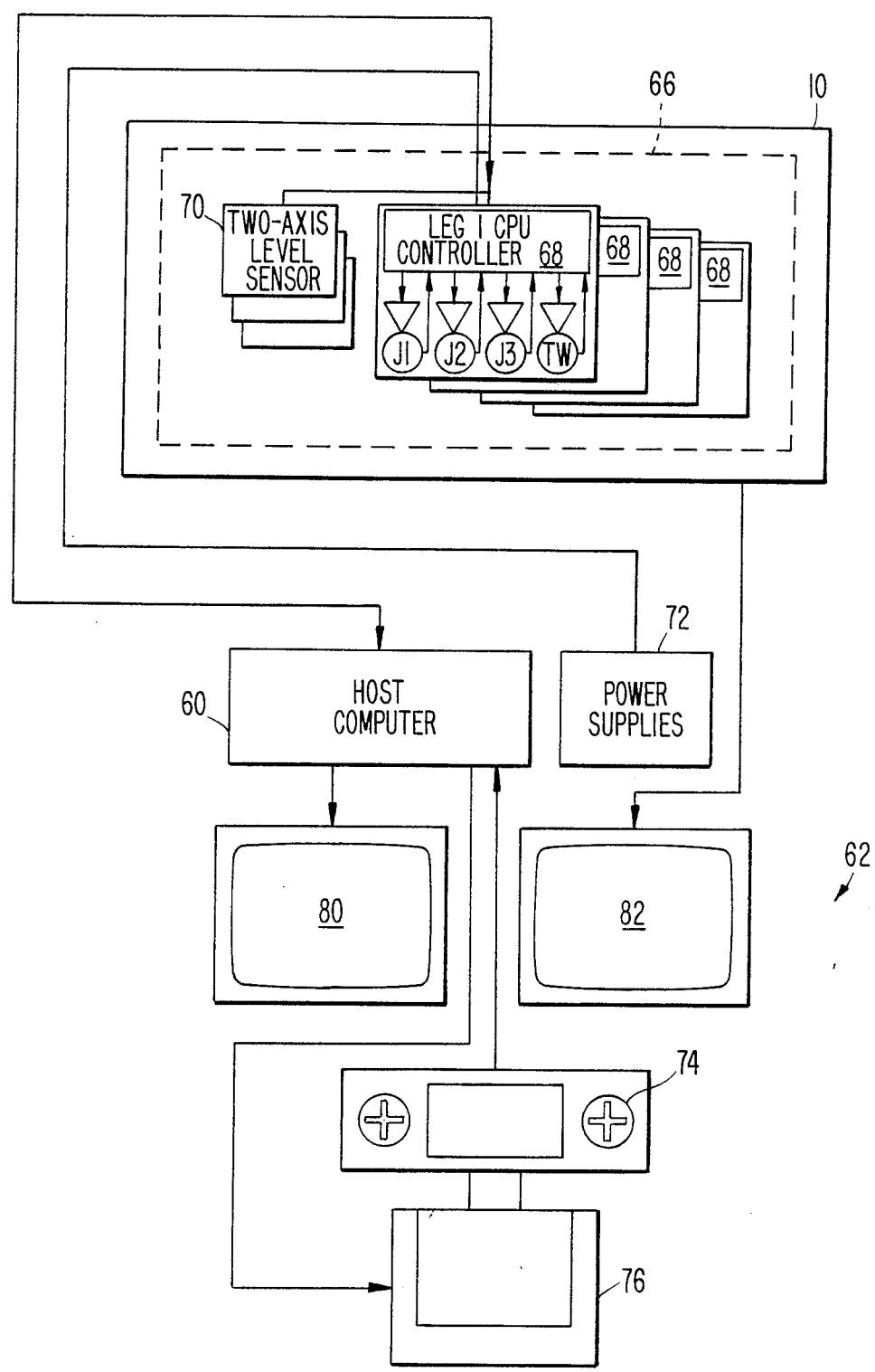
FIG. 5 depicts a flow chart representation of a computer architecture adapted for use in controlling the hybrid robotic vehicle as well as a schematic representation of the components comprising a preferred operator station.

FIG. 5 depicts, in flow chart form, a preferred computer architecture for control of the robotic vehicle 10 of the present invention as well as a schematic representation of several preferred hardware components for use in remotely controlling the vehicle. A host computer 60 which is one component of an operator station 62 is preferably situated in a remote location from the environment in which vehicle 10 is to operate. The host computer 60 may advantageously be a workstation-type computer, of which several commercial models are available, for example, the IRIS®4D/70 workstation sold by Silicon Graphics. At present, the operator is intended to be a human being who is able to control the movement of the vehicle by providing inputs through operator station 62 and computer 60 to the vehicle.

Vehicle 10, shown schematically as a blank box in solid lines, carries an on-board electronics package 66, depicted schematically in broken lines which primarily comprises four CPU controllers 68, each of which is dedicated to one of the legs 14 of the vehicle The controllers 68 accept inputs from the host computer and are responsible for positional servo control of the motors employed in the power packs 40 at each of first, second and third joints 20, 28, and 32 (FIG. 1), respectively. Information related to the angles formed at each joint is fed back through each controller 68 to host computer 60. This positional control and return flow of information for each joint in each leg is represented by the directional arrows and notations J1, J2, and J3 in controller block 68. Each CPU controller also is responsible for accepting commands from the host computer for driving the wheel and track assembly motor or motors 58 on each leg 14 and this is depicted with the notation TW (track, wheel). The onboard electronics package 66 also preferably includes a two-axis "level" sensor 70, which may preferably comprise a longitudinal and a transverse inclinometer which can be employed to provide the host computer with information related to the angle of inclination of main body 12 to a horizontal reference plane.

The operator station 62 includes, in addition to host computer 60, the schematically depicted hardware components in FIG. 5. The power supply or supplies 72 provide power to operate the onboard electronics as well as to operate the motors employed in the power packs 40 and the motor or motors for driving the wheels and track assemblies. The operator station 62 as shown further comprises an input control panel 74, which may include a keyboard, buttons, and/or joystick controls, and a two-axis tilt chair 76. In this configuration, a human operator sits in tilt chair 76 and is able to manually control the inclination of the main body 12. As commands are entered from control panel 74 through host computer 60 to move the vehicle !0, host computer 60 also receives return information from the on-board level sensor 70, which is processed back to the tilt chair 76 wherein the transverse and longitudinal slope of the main body 12 are replicated such that an operator will feel the inclination of the vehicle as if he were actually riding the vehicle. This can assist the operator in maintaining the main body 12 of vehicle level and upright in the modes of operation where such a vehicle attitude is required, and in modes in which a substantial amount of manual control is required. The tilt chair 76 can advantageously be provided with a selectable gain control, from zero to 100% of actual angle of inclination, on both axes, in order to provide maximum utility in a broad range of environments.

The host computer is preferably used to generate at the operator station 62, three dimensional (3-D) solid and wireframe computer graphics models of the vehicle 10 in real time. Further, the host computer will be used to calculate motor position and velocity command signals from the operator's input commands.

A graphics modeling display 80 preferably provides the operator with three animated views of the vehicle 10 along with on-screen control menus and status readings. The code which generates this display features a solid model representation of the vehicle with an operator-defined viewing angle and zoom factor. The remaining two animated views of the vehicle will preferably have pre-defined (top and side) viewing angles and wireframe model representation. A white dot may be employed on the screen to identify the instantaneous center of mass of the vehicle in these two wireframe views.

Figure 6:
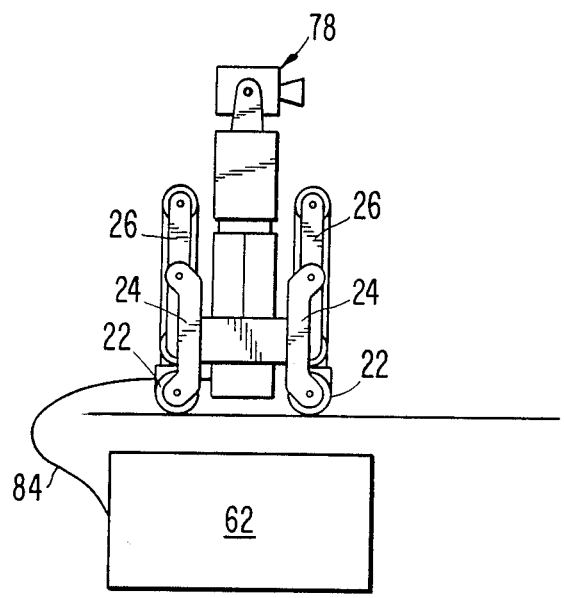
FIG. 6 is a side elevation view of the hybrid robotic vehicle having its appendages positioned to operate in a wheeled mode.

One preferred payload that the vehicle will carry is a television camera 78 (FIG. 6). A monitor 82 is provided at the operator station 62 which is operatively linked with the on-board camera 78, and allows the operator to see the environment around the vehicle The camera 78 may optionally be controllable from the operator station 62 to pivot, tilt and/or zoom such that various viewing angles may be available to the operator Other payloads are envisioned for the mobile robot, including but not limited to laser range finders, robot arms, and probes providing other sensory capabilities.

Turning now to FIGS. 6–10, the vehicle 10 of the present invention is depicted in its various operating modes. Operation in each mode is preferably controlled by one or more specific algorithms selected from a menu at operator station 62. The control algorithms have as a primary goal the minimization of the number of inputs which the user must specify in order to move the vehicle in a desired manner. In FIG. 6, the vehicle 10 is depicted with legs 14 positioned such that the vehicle may operate in its wheeled mode. FIG. 6 also depicts, in substantially schematic form, the operator station 62 of FIG. 5 tethered to vehicle to by cable bundle 84. The tethering might also be accomplished using ribbon cabling or other methods known in the art. It is envisioned that it may be possible to eliminate the tethering entirely through use of radio control or other wireless communication means.

Strut assembly 24 and track assembly 26 are rotated into a substantially vertical orientation for maximizing the compactness of the vehicle 10 when operating in wheeled mode. Although this is the preferred orientation, the primary requirement for permitting the operation of the vehicle in its wheeled mode is that the strut assembly 24 and track assembly 26 of each leg be raised sufficiently to keep clear of the surface being traversed.

The wheeled mode is preferred for relatively smooth and level surfaces because it permits higher speed motion and is easy for the operator to control The second joint 28 and the third joint 32 can be locked in the control algorithms for the wheeled mode such that the struts and tracks are maintained in the depicted orientation. Operator inputs are thus limited to velocity (linear or angular) and directional commands for the vehicle. Based on these inputs, the host computer 60 using the wheeled mode control algorithms will calculate the necessary velocity of each wheel 22 as well as the necessary angle of rotation about the vertical axis V at the first joint 20 of each leg 14. The maximum angle of rotation at each first joint 20 may be practically limited to 45° from a home position parallel to the longitudinal axis of the vehicle 10.

Various algorithms for operation in the wheeled mode would include a steering algorithm which turns the vehicle about an axis of rotation located along the transverse axis of the vehicle 10. This algorithm would permit the operator to drive the vehicle much like he would an automobile. Two of the four wheels operate as a pair of inside wheels and the other two as a pair of outside wheels (depending upon direction of turning), and the algorithm rotates the inside and outside pairs of wheels to the desired angles to effect the desired travel. Another algorithm allows translation of the vehicle at a desired angle without rotation of the vehicle by orienting all wheels such that they are parallel to the desired angle of translation.

Further algorithms which may be employed in controlling the vehicle in its wheeled mode include an algorithm allowing an operator to exercise greater control in selecting an axis of vehicular rotation, for example, rotation about a central vertical axis or another axis perpendicular to the plane of motion. Additionally, the vehicle can be controlled to move parallel to its transverse axis. A combination of a wheeled algorithm and an algorithm for the tracked mode may be used, successively, to establish a vehicle stability stance, wherein each wheel is rotated 45° from the home position, and then the strut assemblies and track assemblies of each leg are lowered such that the lengths of the track assemblies contact the surface. The capability of establishing this stability stance can be advantageous where the payload of the vehicle 10 includes arm-like manipulators (not shown).

Figure 7:
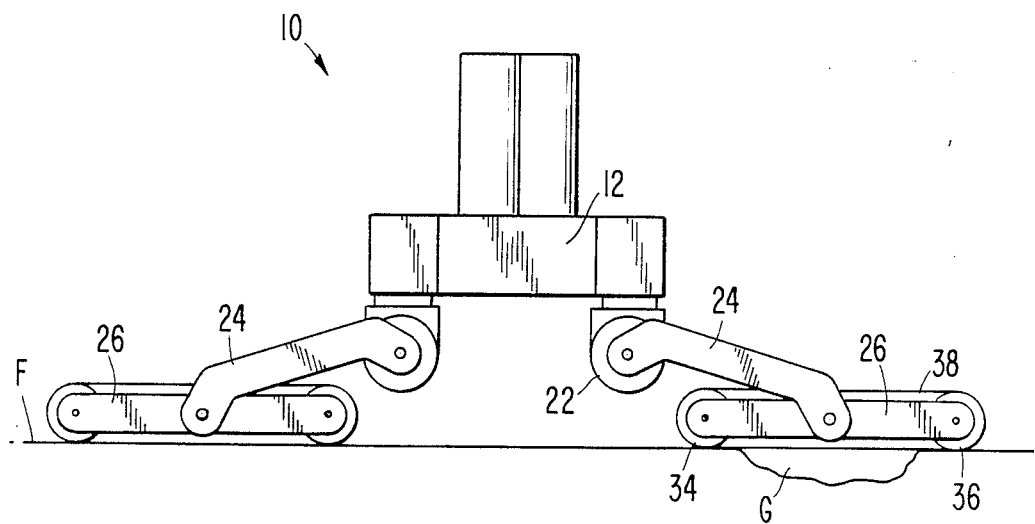
FIG. 7 is a side elevation view of the hybrid robotic vehicle operating in a tracked mode.
Figure 8A:
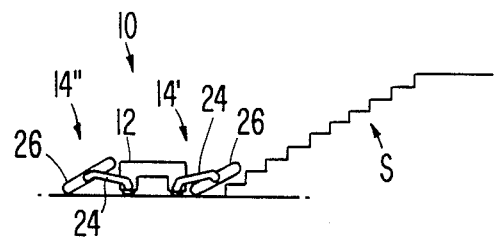
FIGS. 8 a-d are substantially schematic side views of the hybrid robotic vehicle operating in tracked mode to climb a set of steps.
Figure 8B:
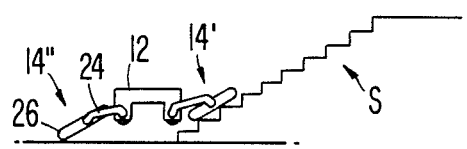
Figure 8C:
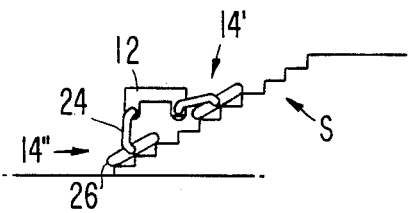
Figure 8D:
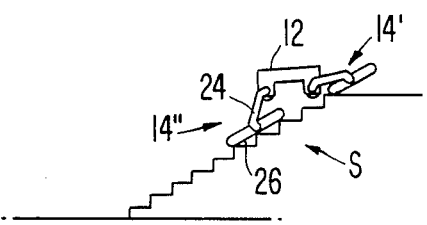
Figure 8E:
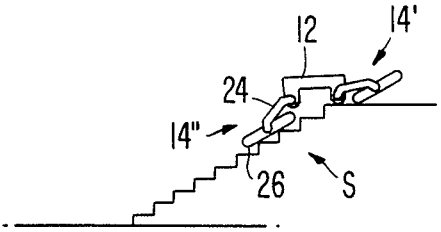
Figure 8F:
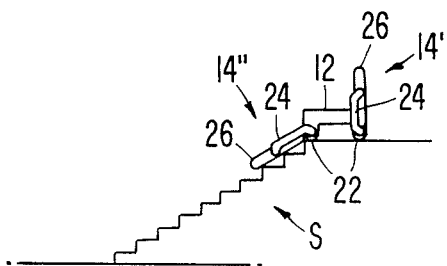

FIGS. 7 and 8 *a–f* depict the vehicle 10 positioned to operate in tracked mode. FIG. 7 depicts the positioning of the tracks to perform basic ground or floor traversing maneuvers, including the crossing of gaps, on a relatively level surface. The tracked mode is preferred in situations where the vehicle is on surfaces which are too soft for efficient use of the wheels, and on increasingly inclined surfaces, including stairs. In general, the tracked mode of operation is characterized by the use of the track assembly 26, rotating endless belt or track 38 of each leg 14 for locomotion, while the strut assemblies 24 are employed to maintain an upright, level posture for the main body 12. Operator inputs for the tracked mode algorithms include the input of a desired vehicle velocity and commands to effect tank-like steering, which is accomplished through the use of differential belt speeds.

For tracked movement along a flat surface F, the operator may, in addition to the inputs mentioned above, control the height of the main body 12 of the vehicle, while keeping the tracks parallel to the direction of travel. The height of main body 12 is changed by rotation of the strut assemblies 24 at both second joint 28 and third joint 32. The gap crossing capabilities of the vehicle are primarily dependent upon the lengths of the track assemblies. For example, a vehicle 10 equipped with a track assemblies which are thirty-two inches in length, having six-inch diameter rollers or track wheels 34, 36, would be capable of crossing or traversing a 24-inch gap G with the main body elevated such that the wheels 22 do not touch the ground. This gap-crossing capability can be enhanced when necessary by lowering the main body such that the wheels are level with the tracks.

As previously indicated, the preferred embodiment of vehicle 10 is designed to be capable of maintaining the main body 12 of the vehicle in a level, upright posture while operating on sloped surfaces while moving in tracked mode. It is preferred that longitudinal (front-to-back) slopes of up to 30° to transverse (side-to-side) slopes of up to 20° can be traversed while keeping main body 12 level. This may be advantageously performed automatically on relatively planar inclined surfaces by an algorithm which uses information from longitudinal and transverse inclinometers (i.e., the two-axis level sensor 70) mounted on main body 12. As the vehicle 10 traverses the surface, the control algorithm for climbing stairs, using feedback from the level sensor 70 on the main body 12, sends commands through the CPU controllers 68 to the second joint actuators 54, to rotate the second joint 28 of each leg such that four points, one on the H2 axis of each leg, are coplanar, and such that both of the longitudinal and transverse inclinometers are servoed to zero degrees of inclination. This algorithm further may permit the track assembly of each leg 14 to freely rotate about third joint 32, or alternatively will send commands to the third joint actuator 56 to position the track parallel to the inclination plane.

In situations where the inclined surface is not substantially planar, and is generally uneven, an additional algorithm would generally be required to keep each of the four tracks 26 always in contact with the surface. The algorithm would preferably employ force or torque sensory feedback sent from the vehicle 10. As an alternative to the automatic leveling algorithms, the operator may employ "manual" control in maintaining the main body 12 upright and level. This manual control will advantageously employ the information from the inclinometers (two-axis level sensor 70) to actuate the tilt chair 76 in the manner previously described. The operator will correct for any changes in slope by, for example, operating a joystick on the control panel 74, based on his own sensory perception.

FIGS. 8 a–f depict, in substantially schematic form, the vehicle 10 and the positioning of legs 14 as the vehicle climbs a flight of stairs in the tracked mode. It is preferred that a specific tracked/stairs algorithm be used for this task, as a specific algorithm will facilitate operator control. It should be noted at this stage that the length of the track assemblies 26 is preferably sufficient to contact at least two steps when climbing staircases of normal design. This provides a decided advantage in that smooth travel may be effected without the sensory and computational demands, commonly required of legged vehicles, associated with continually finding suitable footholds for advancing the vehicle.

As can be seen in FIGS. 8 a–f, in the operation of the vehicle controlled by the tracked/stairs algorithm, the second and third joint angles of the front pair of legs 14' are to remain fixed such that the track assemblies 26 remain parallel to the slope of the stairs. The track assemblies 26 of the rear pair of legs 14" are controlled by the algorithm to remain parallel to the front pair 14', while the strut assemblies 24 of the rear pair 14" automatically keep the main body 12 level in response to level sensor or inclinometer 70 feedback. The terminology "front" and "rear" used to identify pairs of legs 14 is meant only to connote that one pair of legs will climb the stairs ahead of the other, and is not intended to convey the idea that only one of the pairs of legs can perform any particular task in the climbing process. The sequence of figures shows that this simple control scheme works throughout the stair climbing scenario. As the endless belts 38 are activated to move the vehicle toward and up the flight of stairs, the strut assemblies of the rear pair of legs 14" rotate downwardly from their initial pre-climb position (FIG. 8a), as the floor-to-stairs transition (FIG. 8b) and the pure-stair climb (FIG. 8c) are encountered. At the stairs-to-floor transition (FIGS. 8d–f) the strut assemblies of the rear pair of legs 14" begin to rotate upwardly toward their initial position. FIG. 8f further depicts that, if the surface at the top of the stairs is conducive to operation in the wheeled mode, the front legs 14' may be returned to the preferred configuration for that mode, as can be the rear legs 14", once all wheels 22 have reached the upper surface. This same algorithm may be employed in controlling the descent of the vehicle down a flight of stairs as well.

FIGS. 9 a–f and 10 a–f shown the vehicle 10 of the present invention, in substantially schematic form, in two sequences of events in which the legged mode of operation is employed to cross over large and small obstacles. As the legged mode of operation requires the greatest amount of user input and coordinated control, it is preferably primarily used only when neither the wheeled nor tracked modes are capable of negotiating the obstacles or environment at hand. The basic principle in controlling the vehicle in legged mode is to establish a target point on each track assembly 26, located on the axis of rotation of one of the rollers or track wheels 34, 36 and moving the target points in a desired manner to gain footholds for advancing the vehicle in accomplishing a given task.

It should be evident to those skilled in the art that, while the legs 14 of the vehicle 10 will be capable of employing all three degrees-of-freedom in legged mode operation, the movement of the vehicle 10 shown in FIGS. 9 and 10 only employs two degrees-of-freedom, as the obstacles to be hurdled are disposed in an approximately normal orientation with respect to the direction of travel of the vehicle 10. Thus, the first joint 20 of each leg 14 is "locked" into an orientation wherein the track assemblies and strut assemblies are oriented parallel to the longitudinal axis of the vehicle.

In FIGS. 9 a–f, the vehicle 10 is shown crossing over a smaller obstacle, having for example, a cross-section on the order of six inches by six inches. The vehicle may approach the obstacle 100 in wheeled mode, whereupon the operator initiates a command or commands causing the second and third joint actuators to pivot the second joint and the third joint of the front pair of legs 14' away from the vertical orientation (FIG. 6), such that track assemblies 26 and strut assemblies 24 form an approximately triangular arch over the obstacle 100 (FIG. 9a). At the same time, the rear pair of legs 14" are pivoted in a like manner to later assist in lifting the main body 12. FIGS. 9b,c depict a further rotation of the strut assemblies 24 at the second joint 28, and optionally the third joint 32, of each leg, to place the target point end of each track assembly 26 against the ground and to lift main body 12 and the connected wheel assemblies 22 off the ground to a sufficient height to pass over the obstacle.

Figure 9A:
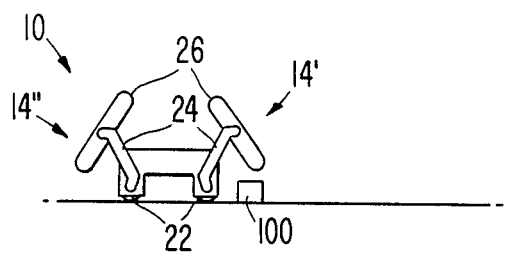
FIGS. 9 a-f are substantially schematic side views of the hybrid robotic vehicle operating to traverse smaller objects in a legged mode.
Figure 9B:
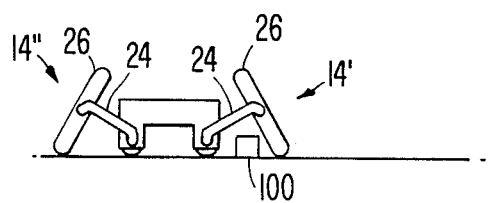
Figure 9C:
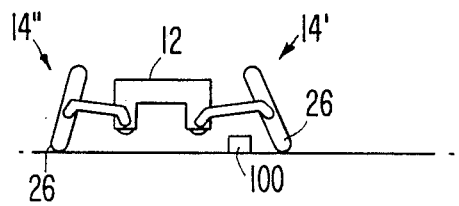
Figure 9D:
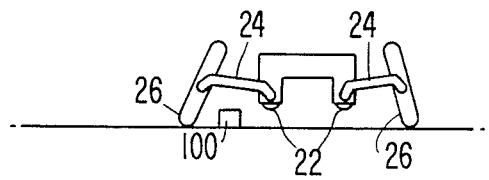

In order to move from the position shown in FIG. 9c to the position in FIG. 9d, the track assemblies 26 on each of the legs are used to drive the vehicle 10 such that the main body 12 passes over the obstacle. FIGS.

9e,f depict the relowering of the vehicle by rotating strut assemblies 24 upwardly such that the trailing track assemblies 26 will clear the obstacle 100. The vehicle may then resume its locomotion in either the wheeled or tracked mode, as appropriate.

Figure 9E:
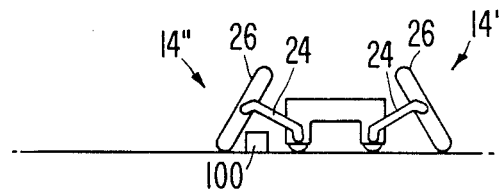
Figure 9F:
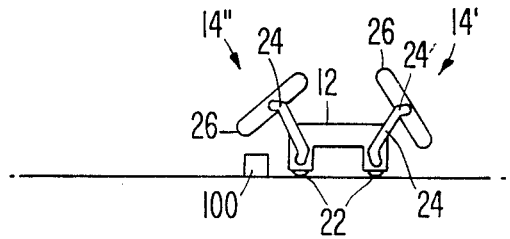

FIGS. 10 a-f depict a sequence wherein the vehicle 10 of the present invention uses its legged mode of operation in order to cross over a larger obstacle 102. Referring back to FIG. 9 momentarily, it may be seen that a limitation exists on the size of an obstacle 100 over which the vehicle can pass using the control sequence set forth in FIGS. 9a-f. In order for the vehicle to pass over the obstacle 100 without contacting the same, the obstacle must fit in the triangular region defined by track assembly 26 and strut assembly 24, as seen in FIGS. 9b and 9e. In a preferred embodiment of the present invention the strut will measure 21 inches between the second and third joints and the track assembly will be 32 inches in total length.

For obstacles of greater size, such as obstacle 102 in FIG. 10, it is generally necessary to make contact with the obstacle, and even to rely on the obstacle for support as the vehicle crosses over. FIG. 10a shows the vehicle's initial positioning of the legs 14' upon encountering a large obstacle 102. The target point ends of the front pair of legs 14' are moved to contact a top surface 104 of the obstacle by rotating the strut assemblies 24 of those legs upwardly.

Figure 10A:
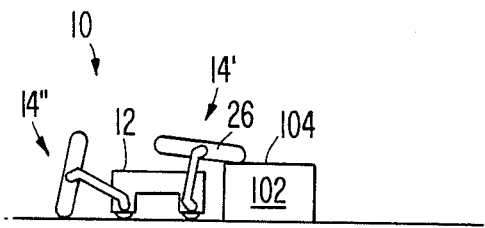
FIGS. 10 a-f are substantially schematic side views of the hybrid robotic vehicle operating to traverse larger objects in a legged mode.
Figure 10B:
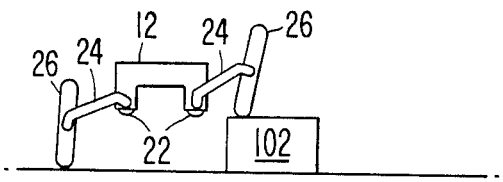
Figure 10C:
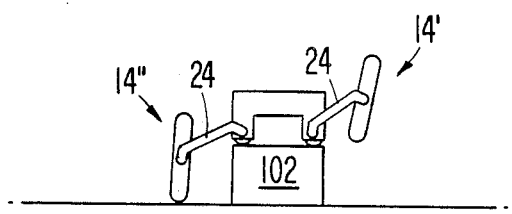

In moving from the FIG. 10a position to the FIG. 10b position, it can be seen that the main body 12 may be maintained in an upright and level orientation through simultaneous movement of the front pair of legs 14' and the rear pair of legs 14". The subsequent forward motion in moving the vehicle to the FIG. 10c position is accomplished by rotating the endless belts of the track assemblies, optionally assisted by driving the wheels.

The strut assemblies 24 of front legs 14' are then rotated downwardly to achieve contact of the target point ends of these legs with the ground on the other side of the obstacle. At the same time, the strut assemblies 24 of rear legs 14" are rotated upwardly such that the target point ends of these rear legs 14" will traverse across the top surface 104 of obstacle 102 when the vehicle is moved farther forward. It should be recognized at this stage that the weight of the vehicle may be nearly entirely supported by the obstacle 102 over which it is crossing.

Figure 10D:
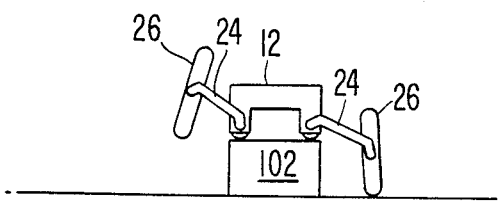
Figure 10E:
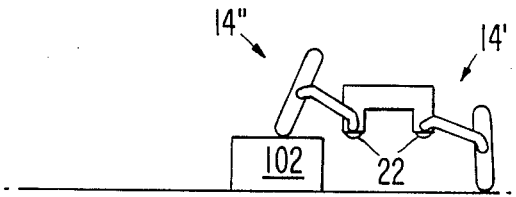
Figure 10F:
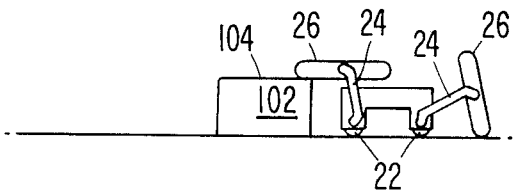

The progression from the FIG. 10d position to the FIG. 10e position is effected by driving the endless belts 38 of the track assemblies 26, again optionally assisted by the driving of wheels 22. The main body 12 of the vehicle is lowered to the ground to the position shown in FIG. 10f by reversing the motion of the front and rear legs employed in lifting the vehicle in FIGS. 10a,b.

Table I below sets forth one particular non-limiting example of a set of operating criteria or performance specifications which can be accomplished by a preferred embodiment of the robotic vehicle 10 of the present invention. Particular preferred dimensions of selected elements of the preferred embodiment adapted to meet the criteria and specifications of Table I are set forth in Table II below.

TABLE I (A) Travel up to a speed of seven (7) ft./sec. on a flat, horizontal surface.
(B) Climb stairs at speeds up to two (2) ft./sec.
(C) Carry a payload of at least 20 lbs.
(D) Vehicle must fit through standard doorways.

TABLE I-continued (E) Cross obstacles up to 20 inches high and up to 24 inches deep within 20 seconds.
(F) Climb slopes of up to 30° inclination and cross side slopes of up to 20° inclination while maintaining main body or payload in upright, level position.
(G) Turn with zero turning radius.
(H) Travel in any direction.
(I) Gross gaps in surface up to 24 inches in length.
(J) Total vehicle weight not to exceed 275 lbs.

TABLE II

| Component | Size (inches) |
| --- | --- |
| Overall Main Body Length | 30 |
| Overall Main Body Width | 16 |
| Wheel Diameter | 8 |
| Strut Assembly Length (measured between second joint and third joint) | 21 |
| Overall Track Length | 32 |
| Roller/Track Wheel Diameter | 6 |

While a preferred embodiment of the invention has been shown and described, it will be appreciated by those skilled in the art that changes or departures may be made from this embodiment without departing from the principles and spirit of the invention. Accordingly, the scope of the present invention is to be determined by referring to the appended claims.

We claim:

1. A hybrid robotic vehicle comprising:
a main body;
a plurality of legs, each of said plurality of legs (1) comprising a strut assembly having a proximal end and a distal end, said proximal end being pivotable about a first horizontal axis independently of rotation of a wheel, and wherein a track assembly on each of said legs is pivotably connected to said distal end of said strut assembly, and (2) being operatively connected to said main body and being pivotable about a vertical axis with respect to said main body;
means for selectively operating said vehicle in a wheeled mode, in a tracked mode, or in a legged mode, wherein each of said plurality of legs further comprises a wheel assembly and a track assembly, and wherein said wheel assembly on each of said plurality of legs has driven means for rotating said wheel about said first horizontal axis; and
said track assembly on each of said plurality of legs has drive means for driving said track, said track assembly further being pivotable about a second horizontal axis spaced apart at a predetermined distance from said first horizontal axis.

2. A hybrid robotic vehicle as defined in claim 1 wherein said vehicle has four legs.

3. A hybrid robotic vehicle as defined in claim 2 wherein said main body has a first actuator housing disposed at each of four corners of said main body, each of said four legs being operatively connected to an associated first actuator housing, and wherein each of said first actuator housings contains a first joint actuator means for pivoting said leg associated therewith about said vertical axis.

4. A hybrid robotic vehicle as defined in claim 3 wherein each of said legs further comprises a second actuator housing connected to an associated first actuator housing wherein each of said second actuator housings contains a second joint actuator means for pivoting an associated one of said strut assemblies connected thereto about said first horizontal axis of each of said legs.

5. A hybrid robotic vehicle as defined in claim 4 wherein said strut assembly on each of said legs has a third joint actuator means operatively connected thereto for pivoting said track assembly about said second horizontal axis with respect to said strut assembly.

6. A hybrid robotic vehicle as defined in claim 5 wherein at least one of said first, second, and third joint actuator means comprises an electric motor operatively coupled with a harmonic drive means for effecting speed reduction of an output of said electric motor, an output of said harmonic drive means further being adapted to effect pivoting at said at least one joint.

7. A hybrid robotic vehicle as defined in claim 1 wherein said means for selectively operating said vehicle in said wheeled mode, said tracked mode or said legged mode, comprises an operator station adapted to be disposed in a location remote from an operating environment of said vehicle.

8. A hybrid robotic vehicle as defined in claim 7 wherein said operator station comprises a computer and an operator control panel in operative communication with said computer.

9. A hybrid robotic vehicle as defined in claim 1 wherein said vehicle further comprises means for controlling an inclination angle of said main body when said vehicle traverses an inclined surface.

10. A hybrid robotic vehicle as defined in claim 9 wherein said controlling means further comprises means for maintaining said main body in a substantially upright and level attitude when said vehicle traverses an inclined surface.

11. A hybrid robotic vehicle as defined in claim 10 wherein said controlling means further comprises a means for sensing a longitudinal angle of inclination and a transverse angle of inclination of said main body, said sensing means being disposed on said main body.

12. A hybrid robotic vehicle as defined in claim 11 wherein said means for selectively operating said vehicle in said wheeled mode, said tracked mode, or said legged mode, comprises an operator station adapted to be disposed in a location remote from an operating environment of said vehicle.

13. A hybrid robotic vehicle as defined in claim 12 wherein said operator station comprises a computer and an operator control panel in operative communication with said computer.

14. A hybrid robotic vehicle as defined in claim 13 wherein said operator station further comprises a chair means for tilting an operator seated thereon at a longitudinal angle and transverse angle corresponding to said longitudinal angle and said transverse angle sensed by said sensing means.

15. A hybrid robotic vehicle as defined in claim 8 wherein said vehicle and said operator station are operatively connected by a cable.

16. A hybrid robotic vehicle as defined in claim 8 wherein said operating station further includes a graphics display means for depicting at least one representation of said vehicle at said operating station.

17. A hybrid robotic vehicle as defined in claim 8 wherein said main body carries means for acquiring sensory data.

18. A hybrid robotic vehicle as defined claim 17 wherein said sensory acquiring means comprises a television camera.

19. A hybrid robotic vehicle comprising:
a main body;
a plurality of appendages, each of said plurality of appendages being connected to said main body, each of said plurality of appendages being pivotable about a vertical axis with respect to said main body; wherein each of said plurality of appendages further comprises a strut assembly having a proximal end and a distal end with respect to said vertical axis, each of said strut assemblies being pivotable about a first horizontal axis at said proximal end;
each of said appendages further having a wheel assembly and a track assembly, said wheel assembly being disposed at said proximal end of said strut assembly, said wheel assembly being rotatable independently of the strut assembly about a horizontal axis, said track assembly being connected to said strut assembly near said distal end of said strut assembly, said track assembly being pivotable about a second horizontal axis with respect to said strut assembly;
means for selectively positioning said plurality of appendages into a plurality of predetermined locomotion configurations; and
locomotion means for moving said vehicle across a surface, said locomotion means being operatively connected to said wheel assembly and said track assembly.

20. A hybrid robotic vehicle as defined in claim 19 wherein said main body contains a plurality of first actuator housings, each of said first actuator housings having a different one of said plurality of appendages associated therewith, each of said first actuator housings also having a first joint actuating means disposed therein for pivoting each of said associated appendages about said vertical axis.

21. A hybrid robotic vehicle as defined in claim 20 wherein each of said plurality of appendages further comprises a second actuator housing connected to said associated first joint actuating means, each of said second actuator housings containing a second joint actuating means for pivoting said strut assembly of each appendage about said first horizontal axis independently of said rotation of said wheel assembly, each of said second joint actuating means being connected to said proximal end of said strut assembly.

22. A hybrid robotic vehicle as defined in claim 21 wherein said strut assembly of each of said plurality of appendages has a third joint actuating means disposed thereon for pivoting said track assembly about said second horizontal axis with respect to said strut assembly.

23. A hybrid robotic vehicle as defined in claim 22 wherein at least one of said first, second, and third joint actuating means comprises an electric motor adapted to produce positional feedback, said electric motor being operatively coupled to a drive means for pivoting of said at least one joint, said drive means further having speed reducing means for reducing an output speed of said electric motor.

24. A hybrid robotic vehicle as defined in claim 23 wherein said locomotion means comprises at least one electric motor disposed on each of said plurality of appendages to drive said wheel and said track assembly.

25. A hybrid robotic vehicle as defined in claim 24 wherein said vehicle has four appendages.

* * * * *